GINDRE & DOERLER.
Oven.
No. 39,042. Patented June 30, 1863.
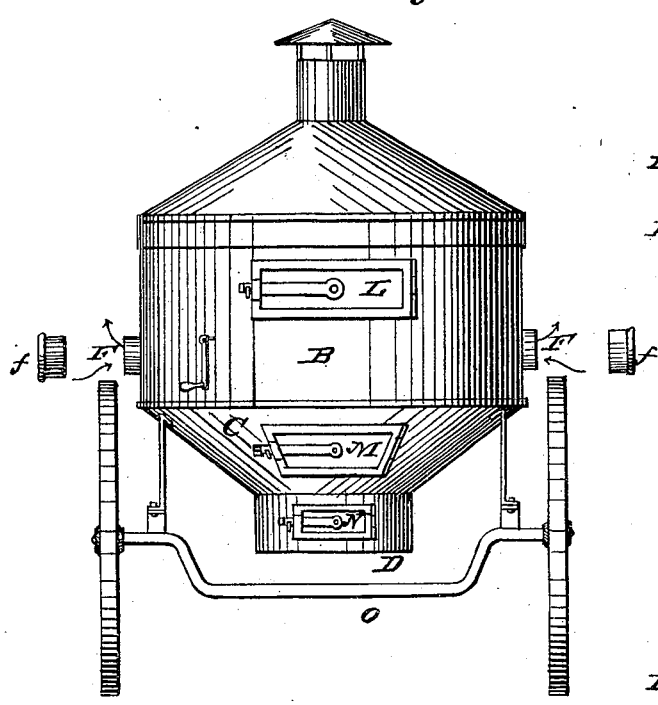
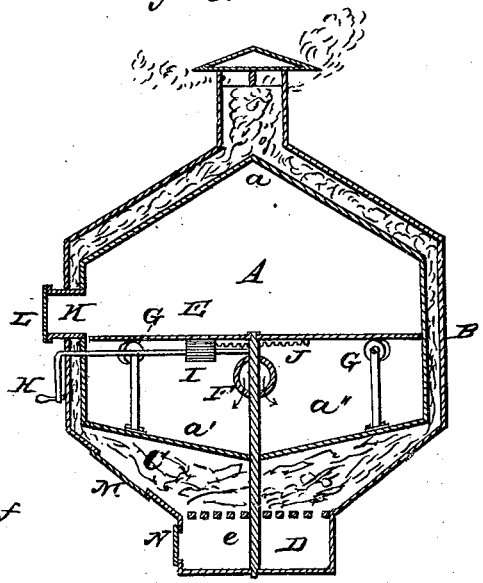
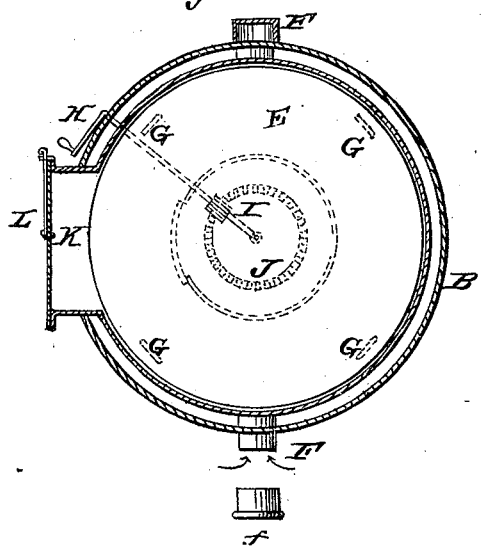

E. C. Gillette.
Heating Drum.
N°. 39,041. Patented Jan. 30, 1863.
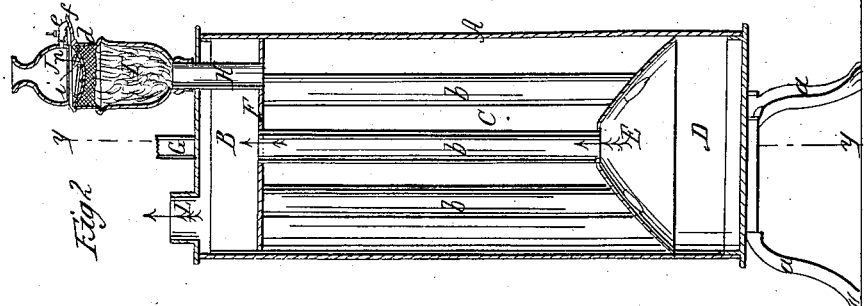
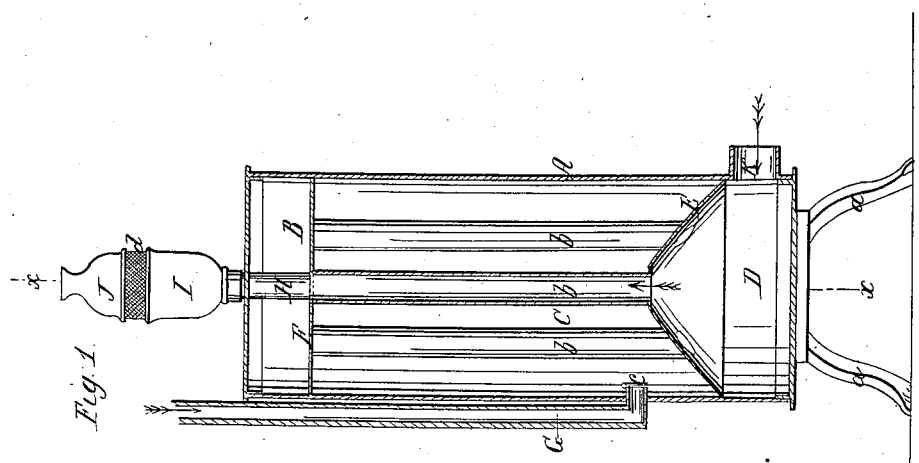
Witnesses:
J W Coombs
G W Reed
Inventor;
E C Gillette
per Munn & Co
attorneys